March 27, 1928.
E. J. NASH
DISHWASHER
Filed April 7, 1927
1,664,084
2 Sheets-Sheet 1
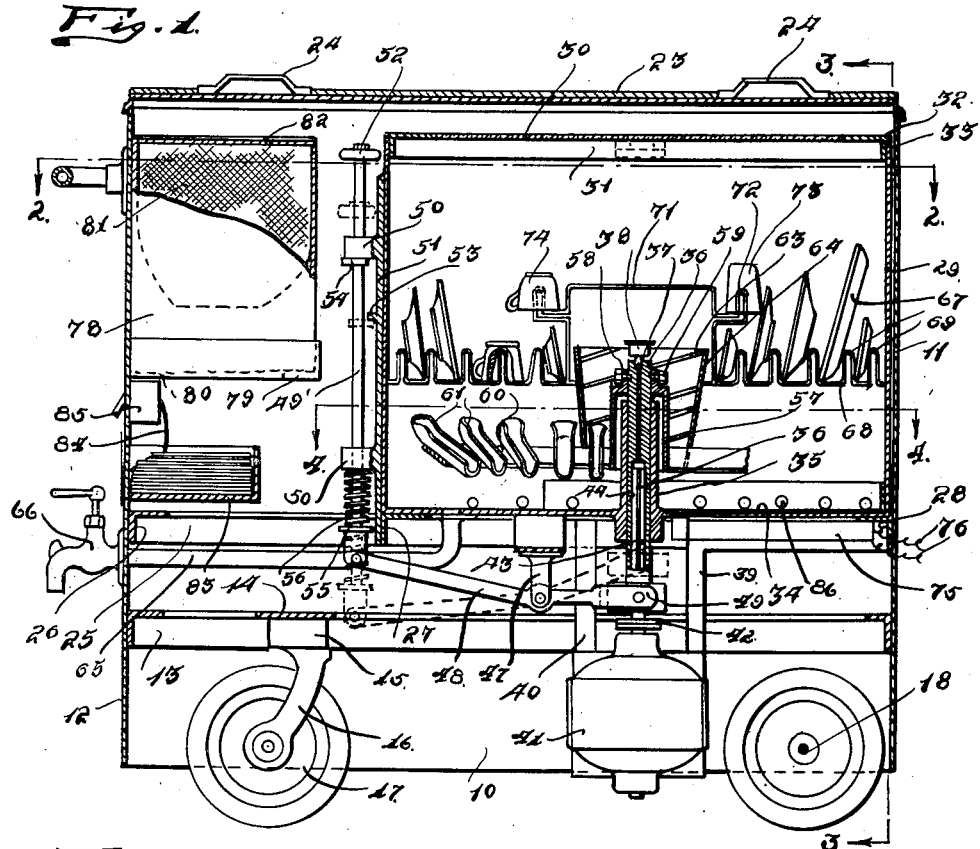
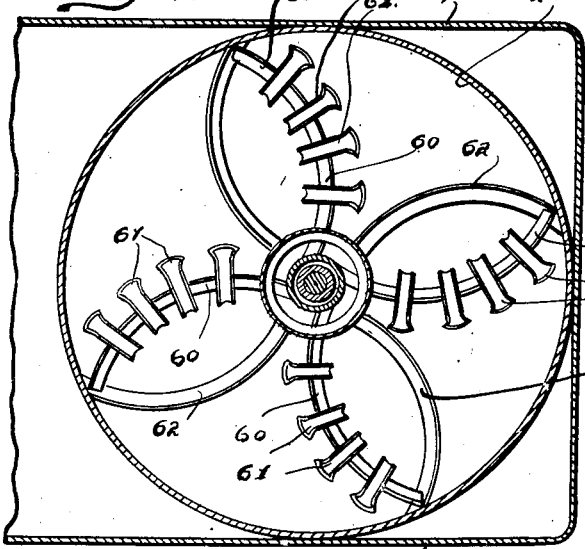
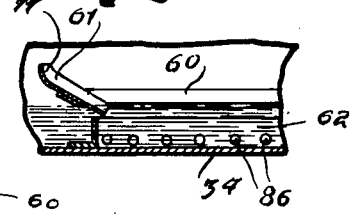
INVENTOR.
Ernest J. Nash.
BY
Thos. L. Donnelly
ATTORNEY.

March 27, 1928.
E. J. NASH
1,664,084
DISHWASHER
Filed April 7, 1927    2 Sheets-Sheet 2
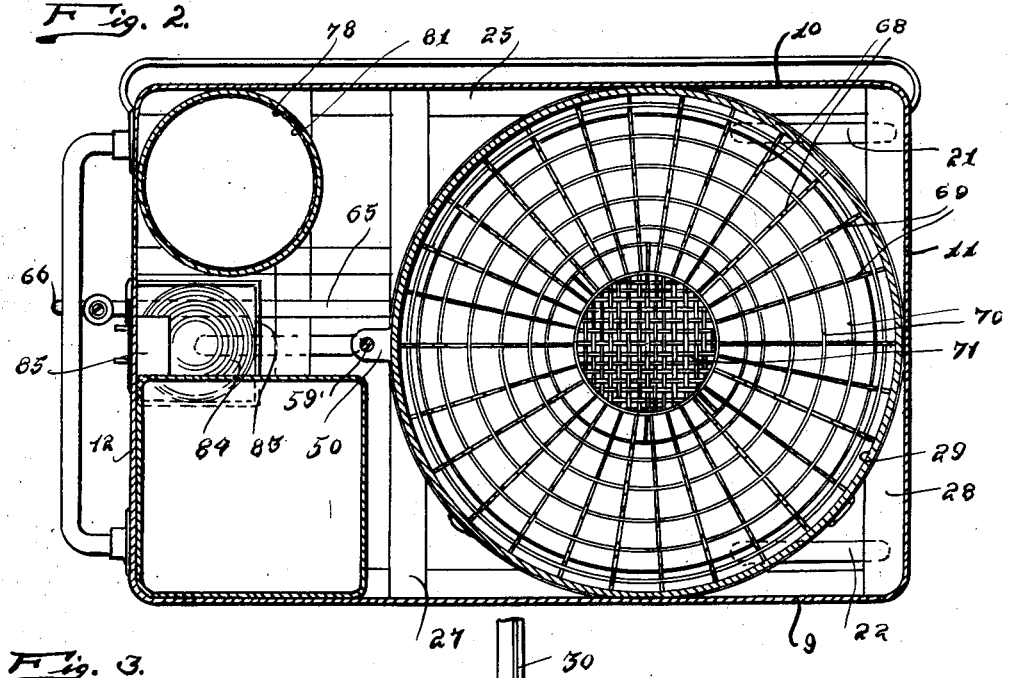
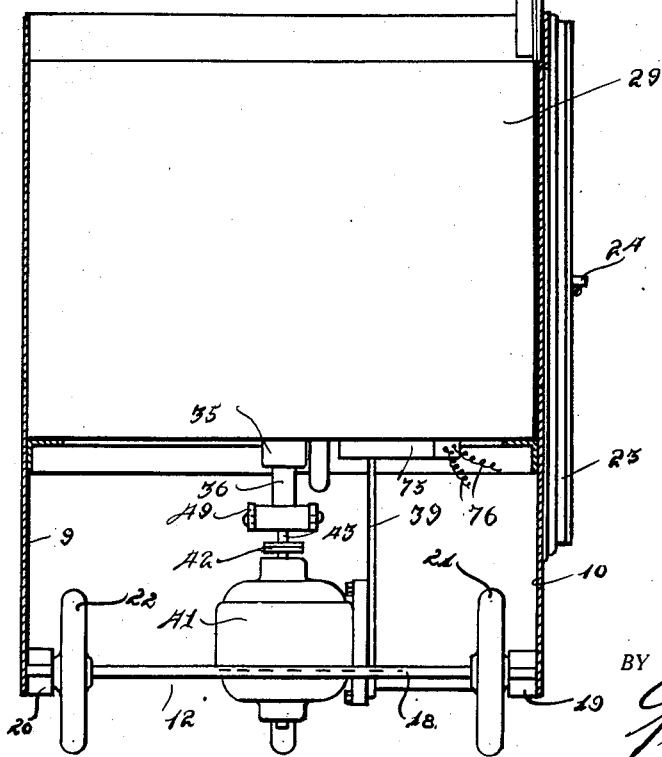
INVENTOR.
Ernest J. Nash
BY
ATTORNEY.

Patented Mar. 27, 1928.

1,664,084

UNITED STATES PATENT OFFICE.

ERNEST J. NASH, OF DETROIT, MICHIGAN.

DISHWASHER.

Application filed April 7, 1927. Serial No. 181,637.

My invention relates to a new and useful improvement in a dish washer and has for its object the provision of a dish washer which will be simple in structure, economical of manufacture and highly efficient in use.

Another object of the invention is the provision of a dish washer having rotatable means for deflecting the washing fluid upwardly against the dishes to be washed.

Another object of the invention is the provision in a dish washer of this class of a mechanism, when moved to one position, adapted for splashing the water against the dishes, and when moved to another position, adapted for producing a current of air for drying purposes.

Another object of the invention is the provision of a dish washer having means for forcing the water into contact with the dishes from the underside and spraying the water on the dishes from above.

Another object of the invention is the provision of a dish washer which may be economically operated and constructed in a compact form so as to occupy a minimum amount of space.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention.

Fig. 2 is a view taken on substantially line 2—2 of Fig. 1.

Fig. 3 is a view taken on substantially line 3—3 of Fig. 1.

Fig. 4 is a view taken on substantially line 4—4 of Fig. 1.

Fig. 5 is a fragmentary sectional view illustrating the splash member used in the invention.

In the invention I provide a housing having side walls 9 and 10, and end walls 11 and 12, mounted upon which, above the lower limits of these walls, is an angle iron or other reinforcing frame forming member 13 having a cross bar 14, upon which is fixedly mounted the bearing 15 for the yoke 16 in which the castor or traction member 17 is journalled. The shaft 18 is journalled in bearings 19 and 20 secured to the side walls 9 and 10. Mounted on this shaft 18 are wheels 21 and 22. A cover 23 having handles 24 is provided for the housing. Mounted on the side walls, above the reinforcing rib 13, is an angle iron 25 connected to transversely extending angle irons 26, 27 and 28. The angle irons 27 and 28 serve as a support for a reservoir 29 which is mounted within the housing and, as shown in Fig. 2, preferably of cylindrical formation. A cover 30 is provided for the reservoir, this cover having a flange 31 which extends into the reservoir, this flange being inwardly offset to provide the peripheral flange 32 which engages the gasket 33 positioned between the flange 32 and the upper edge of the reservoir 29. Mounted in the base 34 of the reservoir and projecting upwardly therefrom is a bearing sleeve 35 in which is slidably mounted the shaft 36 provided with a central passage 37 formed therein communicating with the cup 38 mounted on its upper end. Supported by bars 39 and 40 below the reservoir is an electric motor 41 connected to a suitable source of electrical energy. Connected by the coupling 42 to the shaft of the motor is a shaft having splines 43 engaging in axially extending grooves 44 formed in the shaft 36, the shaft 43 being slidable axially of the shaft 36. Projecting downwardly from the reservoir is a bracket 47 on which is pivotally mounted, intermediate its ends, the lever 48 having a fork 49 embracing and keyed to the shaft 36. The other end of the lever 48 is swivelly connected to a rod 49' which extends vertically through guide brackets 50 carried by a plate 51 which is secured to the reservoir and to the angle iron 27. A knob 52 is mounted on the upper end of the rod 49'. Projecting upwardly from the plate 51 is a boss 53. Secured fixedly on the rod 49' is a finger 54. Mounted fixedly on the rod 49' is a collar 55 which engages one end of a spring 56, the other end engaging the bracket 50 and tending normally to press the fork carried by the lever 48 upwardly.

Embracing the bearing sleeve 35 and rotatable thereon is a supporting sleeve 57 having a neck 58 through which are projected set screws 59 to engage the shaft 36 and effect a rotation of the sleeve 57 in unison therewith. Secured to and projecting outwardly from the sleeve 57 are arcuate arms 60, mounted upon each of which in spaced relation are a number of deflecting troughs 61, these deflecting troughs being inclined to the base 34 of the reservoir, as clearly appears in Fig. 1 and Fig. 5. Secured to the base and projecting outwardly from the center thereof are arcuate breakwater arms 62. Extending outwardly from the sleeve 57 are spirally arranged blades 63 which rotate with the sleeve 57, these blades connecting to a conical shell 64.

A drain pipe 65 having the faucet 66 connected therewith communicates with the reservoir 29 to provide means for emptying the same.

A tray for supporting dishes 67 is provided, this tray being mounted in the reservoir 29 a substantial distance above the base 34. The tray comprises a number of radially extending wires 68 with upwardly projecting, doubled over portions 69 in spaced relation. Connecting the radially extending wires 68 are circular wires 70, these wires 68 radiating outwardly from a cup shaped member 71 which is made from mesh and provided with a number of reinforcing wires having a portion buckled and angularly turned to form the supporting arms 72, upon which a glass 73 or a cup 74 may be positioned.

An electric heater 75 connected by the wires 76 to a suitable source of electrical energy serves as a means for heating the water which is deposited in the reservoir 29.

In operation the water is poured into the reservoir at the desired temperature and provided with cleansing powder, if desired. The dishes to be washed are placed on the tray or the supporting arms 72.

The motor is then set into rotation, the device being in the position shown in Fig. 1, this rotation of the motor effecting a rotation of the arms 60 so that the trough members 61 engaging the water will, on account of the inclined rear end 77, serve to splash the water upwardly against the dishes placed on the tray. At the same time, the spirally arranged blades 63 will throw the water upwardly and outwardly fountain-like so as to precipitate the same from above on the dishes, this action effecting a very thorough cleansing of the dishes placed on the tray in a minimum amount of time.

When the washing process has been completed, the rod 49' may be shoved downwardly and turned so as to engage the finger 54 below the boss 53, as shown in dotted lines in Fig. 1, thus raising the arms 60 out of the water level. As these arms are rotated by the motor they will set up a current of air, which, being heated by the hot water in the reservoir, will serve very quickly to dry the dishes.

When the arms 60 are being rotated for washing purposes, in order that the water may be held as near stationary as possible, and permit the troughs to operate most efficiently, the breakwater arms 62 have been provided.

In this way, a washing and drying of the dishes may be very easily and quickly effected with the same device.

As shown in Fig. 1, the reservoir 29 does not completely fill the housing provided, and at one end thereof I have constructed a receptacle 78 which is mounted on the angle iron 79 and the plate 80. Supported in this receptacle 78 is a mesh bag 81 in which garbage may be deposited, the liquid in the garbage dripping through the mesh bag 81 into the container 78 which is removable from its mountings. A suitable cover 82 is provided for the receptacle 78. A shelf or housing 83 is mounted beneath the garbage receptacle 78 to serve as a support for the electrical wire 84 which is used to connect to the wall plug, a suitable switch 85 being mounted on the housing for controlling the operation of the motor 41.

The arms 62 are provided with a number of openings 86 to permit a slight circulation of the water in the reservoir.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A dish washer comprising: a reservoir; a dish tray mounted in said reservoir; means rotatably mounted in said reservoir for throwing water against said dishes, said means being axially movable of said reservoir at will; and means for raising said throwing means out of said water, said throwing means being adapted upon rotation out of said water for setting up a current of air in said reservoir, for drying said dishes.

2. A dish washer comprising: a reservoir; a dish tray mounted in said reservoir; rotatable means for directing water against said dishes while on said tray; means for raising said rotatable means out of said water, said rotatable means upon rotation while out of said water, producing air currents for drying said dishes.

3. In a dish washer, a reservoir; rotatable means for raising the water in said reservoir above its normal level and splashing the same against dishes mounted in said reservoir; means for raising said rotatable means out of said water, the rotation of said rotatable means while out of said water, producing air currents for drying said dishes.

4. In a dish washer, a reservoir; rotatable means for raising the water in said reservoir above its normal level and splashing the same against dishes mounted in said reservoir; means for raising said rotatable means out of said water, the rotation of said rotatable means while out of said water, producing air currents for drying said dishes; and breakwater devices mounted in said reservoir for resisting movement of said water around said reservoir upon rotation of said rotatable means.

5. A dish washer of the class described, comprising: a reservoir; a dish support in said reservoir normally above the water line of said reservoir; rotatable means for splashing the water in said reservoir against said dishes from below; means for raising said rotatable means above the water level, the rotation of said rotatable means while above the water level producing air currents for drying said dishes; rotatable means for elevating water from said reservoir above said dishes and spraying the same thereon from above.

6. A dish washer of the class described, comprising: a reservoir; a dish support in said reservoir normally above the water level; means for forcing the water in said reservoir against said dishes from below; and means for raising said forcing means out of said water, said forcing means, while raised out of the water, producing air currents for drying said dishes.

7. A dish washer of the class described, comprising: a reservoir; a dish support in said reservoir normally above the water level; means for forcing the water in said reservoir against said dishes from below; means for raising said forcing means out of said water, said forcing means, while raised out of the water, producing air currents for drying said dishes; and means for raising the water above the level of said support and spraying the same on said dishes from above.

8. A dish washer of the class described, comprising: a reservoir; a bearing projecting into said reservoir from below; a rotatable member on said bearing; a shaft projected through said bearing for rotating said rotatable member; a plurality of arcuate arms on said rotatable member; a plurality of upwardly inclined trough shaped members on said arms; a dish support mounted in said reservoir, the rotation of said trough shaped members forcing water against said dishes from below; means for raising said trough shaped members out of said water, the rotation of said trough shaped members while out of said water, producing currents of air for drying said dishes; and means for rotating said rotatable member.

9. A dish washer of the class described, comprising: a reservoir; a bearing projecting into said reservoir from below; a rotatable member on said bearing; a shaft projected through said bearing for rotating said rotatable member; a plurality of arcuate arms on said rotatable member; a plurality of upwardly inclined trough shaped members on said arms; a dish support mounted in said reservoir, the rotation of said trough shaped members forcing water against said dishes from below; means for raising said trough shaped members out of said water, the rotation of said trough shaped members while out of said water, producing currents of air for drying said dishes; and means for locking said trough shaped members for rotation in either position of movement.

In testimony whereof I have signed the foregoing specification.

ERNEST J. NASH.